(12) United States Patent
Ohshima

(10) Patent No.: US 7,791,742 B2
(45) Date of Patent: Sep. 7, 2010

(54) IMAGE PROCESSING APPARATUS, CONTROL METHOD THEREFOR, PROGRAM, AND COMPUTER-READABLE STORAGE MEDIUM

(75) Inventor: Hideaki Ohshima, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 648 days.

(21) Appl. No.: 11/763,788

(22) Filed: Jun. 15, 2007

(65) Prior Publication Data

US 2007/0297016 A1 Dec. 27, 2007

(30) Foreign Application Priority Data

Jun. 21, 2006 (JP) ............... 2006-171695

(51) Int. Cl.
*G06F 15/00* (2006.01)
(52) U.S. Cl. ..................... 358/1.1; 358/1.15
(58) Field of Classification Search ............... 358/1.1, 358/1.9, 1.13, 1.15, 1.16, 296, 909.1
See application file for complete search history.

(56) References Cited

U.S. PATENT DOCUMENTS

| 7,193,646 | B1 * | 3/2007 | Shioji ............... 348/220.1 |
| 7,385,635 | B2 * | 6/2008 | Kobayashi et al. ..... 348/231.99 |
| 2001/0048534 | A1 * | 12/2001 | Tanaka et al. ............... 358/1.16 |
| 2007/0047821 | A1 * | 3/2007 | Nonaka et al. ............... 382/224 |
| 2008/0012954 | A1 | 1/2008 | Sasaki et al. |
| 2008/0292212 | A1 | 11/2008 | Ozaki |

FOREIGN PATENT DOCUMENTS

| JP | 10-215397 | 8/1998 |
| JP | 2001-177789 A | 6/2001 |
| JP | 2002-033896 | 1/2002 |
| WO | 2006/022289 A | 3/2006 |
| WO | 2006-041171 A | 4/2006 |

OTHER PUBLICATIONS

The above references were cited in a Mar. 27, 2009 Chinese Office Action that issued in Chinese Patent Application No. 200710112038. 8, which is enclosed with English Translation.
The above referemces were cited in a Feb. 5, 2010 Chinese Office Action, which is enclosed with English Translation, that issued in Chinese Patent Application No. 200710112038.8.

* cited by examiner

*Primary Examiner*—Thomas D Lee
(74) *Attorney, Agent, or Firm*—Cowan, Liebowitz & Latman, P.C.

(57) ABSTRACT

A digital camera 100 groups items of image data matching in their image pickup condition into a group and generates a list of the grouped image data. The digital camera 100 selects a representative image from the grouped image data and transfers the representative image and the list to a PC 150. An application 160 runs on the PC 150. A user can use the application 160 to browse the grouped image data and cause any items of image data other than the representative image to be transferred from the digital camera 100 to the PC 150.

10 Claims, 10 Drawing Sheets

IMAGE PROCESSING APPARATUS, CONTROL METHOD THEREFOR, PROGRAM, AND COMPUTER-READABLE STORAGE MEDIUM

BACKGROUND OF THE INVENTION

1. Field of the Invention

The present invention relates to an image processing apparatus that transfers stored image data to an external apparatus such as a PC (personal computer), and a control method therefor.

2. Description of the Related Art

Image processing apparatuses are known that can transfer stored image data to an external apparatus such as a PC (personal computer) via, for example, a network. Also widely used are image pickup apparatuses having a shooting mode, such as a continuous shooting mode or a bracket shooting mode, in which a plurality of items of image data are continuously obtained with one shooting instruction. Furthermore, it is becoming common that these image pickup apparatuses, like the aforementioned image processing apparatuses, have a function of transferring shot (or stored) image data to an external apparatus via a network or the like.

Generally, items of image data (referred to as continuously shot image data) shot in a shooting mode in which a plurality of shots are taken with one shooting instruction have a high correlation with each other.

Meanwhile, techniques are known that allow a user to operate an external apparatus to select image data to be transferred from an image processing apparatus to the external apparatus (see Japanese Patent Laid-Open No. 2002-33896 and Japanese Patent Laid-Open No. 10-215397).

According to the technique disclosed in the Japanese Patent Laid-Open No. 2002-33896, the image processing apparatus generates a parameter list including: attached information about a plurality of items of stored image data; and the names of files containing the items of image data. The user can refer to the parameter list via the external apparatus to select only necessary items of image data, and give the instruction to transfer the items of image data from the image processing apparatus to the external apparatus.

According to the technique disclosed in the Japanese Patent Laid-Open No. 10-215397, the external apparatus obtains thumbnail images for image data stored in the image processing apparatus. The user can refer to the thumbnail images via the external apparatus to select images to be transferred from the image processing apparatus to the external apparatus.

As the performance of continuous shooting of image pickup apparatuses is improving these years, many items of image data can be obtained in a short time. Therefore, image processing apparatuses often have many items of continuously shot image data having a high correlation with each other.

However, the Japanese Patent Laid-Open No. 2002-33896 and the Japanese Patent Laid-Open No. 10-215397 do not particularly consider how to treat items of image data with a high correlation with each other. Therefore, in cases such as where many highly correlated images like continuously shot images are included, it is difficult for the user to select via the external apparatus items of image data to be transferred. This is because, for example in the technique of the Japanese Patent Laid-Open No. 10-215397, the external apparatus receives many thumbnail images for highly correlated items of image data and therefore displays many substantially overlapping thumbnail images, making it difficult for the user to find desired items of image data among those thumbnail images.

The present invention has been made in the light of these situations, and a feature thereof is to provide a technique that facilitates a user's selection of desired items of image data even when many items of image data with a high correlation with each other are included.

SUMMARY OF THE INVENTION

According to an aspect of the present invention, there is provided an image processing apparatus comprising:

an image pickup unit which picks up images of an object and generates image data;

a generation unit which generates a list on which one or more items of the image data generated by the image pickup unit are to be registered;

a registration unit which registers image data on the list;

a selection unit which selects representative image data from one or more items of image data registered on the list;

a first transfer unit which transfers at least one of the list and the representative image data selected from the list to an external apparatus; and a determination unit which determines whether or not a predetermined relationship holds true between an image pickup condition of first image data generated by the image pickup unit and an image pickup condition of second image data generated one before the first image data by the image pickup unit, wherein <a> if the determination unit determines that the predetermined relationship does not hold true, the generation unit generates a new list and the registration unit registers the first image data on the list, and <b> if the determination unit determines that the predetermined relationship holds true, the registration unit registers the first image data on a list on which the second image data is registered.

According to another aspect of the present invention, there is provided an image processing apparatus comprising:

a storage unit which stores a plurality of items of image data;

a generation unit which generates a list on which one or more items of image data are to be registered;

a registration unit which registers image data on the list;

a selection unit which selects representative image data from one or more items of image data registered on the list;

a first transfer unit which transfers at least one of the list and the representative image data selected from the list to an external apparatus;

an acquisition unit which acquires an image pickup condition of each of the plurality of items of image data; and a classification unit which classifies the plurality of items of image data into groups, each group including one or more items of image data for which a predetermined relationship holds true between respective image pickup conditions, wherein the generation unit generates as many lists as the number of groups formed by the classification unit, and the registration unit registers items of image data classified into the same group by the classification unit on the same list.

According to yet another aspect of the present invention, there is provided a control method for an image processing apparatus comprising the steps of:

picking up images of an object and generating image data;

generating a list on which one or more items of the image data generated in the step of picking up are to be registered;

registering image data on the list;

selecting representative image data from one or more items of image data registered on the list;

transferring at least one of the list and the representative image data selected from the list to an external apparatus; and determining whether or not a predetermined relationship holds true between an image pickup condition of first image data generated in the step of picking up and an image pickup condition of second image data generated one before the first image data in the step of picking up, wherein <a> if it is determined that the predetermined relationship does not hold true in the step of determining, a new list is generated in the step of generating and the first image data is registered on the list in the step of registering, and <b> if it is determined that the predetermined relationship holds true in the step of determining, the first image data is registered on a list on which the second image data is registered in the step of registering.

According to another aspect of the present invention, there is provided a control method for an image processing apparatus with a storage unit which stores a plurality of items of image data, comprising the steps of:

generating a list on which one or more items of image data are to be registered;

registering image data on the list;

selecting representative image data from one or more items of image data registered on the list;

transferring at least one of the list and the representative image data selected from the list to an external apparatus;

acquiring an image pickup condition of each of the plurality of items of image data; and classifying the plurality of items of image data into groups, each group including one or more items of image data for which a predetermined relationship holds true between respective image pickup conditions, wherein as many lists as the number of groups formed in the step of classifying are generated in the step of generating, and items of image data classified into the same group in the step of classifying are registered on the same list in the step of registering.

According to yet another aspect of the present invention, there is provided a program stored in a computer-readable storage medium for causing a computer to execute a control method for an image processing apparatus, the control method comprising the steps of:

picking up images of an object and generating image data;

generating a list on which one or more items of the image data generated in the step of picking up are to be registered;

registering image data on the list;

selecting representative image data from one or more items of image data registered on the list;

transferring at least one of the list and the representative image data selected from the list to an external apparatus; and determining whether or not a predetermined relationship holds true between an image pickup condition of first image data generated in the step of picking up and an image pickup condition of second image data generated one before the first image data in the step of picking up, wherein <a> if it is determined that the predetermined relationship does not hold true in the step of determining, a new list is generated in the step of generating and the first image data is registered on the list in the step of registering, and <b> if it is determined that the predetermined relationship holds true in the step of determining, the first image data is registered on a list on which the second image data is registered in the step of registering.

According to another aspect of the present invention, there is provided a program stored in a computer-readable storage medium for causing a computer to execute a control method for an image processing apparatus with a storage unit which stores a plurality of items of image data, the control method comprising the steps of:

generating a list on which one or more items of image data are to be registered;

registering image data on the list;

selecting representative image data from one or more items of image data registered on the list;

transferring at least one of the list and the representative image data selected from the list to an external apparatus;

acquiring an image pickup condition of each of the plurality of items of image data; and classifying the plurality of items of image data into groups, each group including one or more items of image data for which a predetermined relationship holds true between respective image pickup conditions, wherein as many lists as the number of groups formed in the step of classifying are generated in the step of generating, and items of image data classified into the same group in the step of classifying are registered on the same list in the step of registering.

According to yet another aspect of the present invention, there is provided an image processing apparatus comprising:

an image pickup unit which picks up images of an object and generates image data;

a determination unit which determines whether or not a predetermined relationship holds true between image pickup conditions of a plurality of items of image data generated by the image pickup unit;

a generation unit which generates, if the determination unit determines that the predetermined relationship holds true, a list of plurality of items of image data generated by the image pickup unit;

a selection unit which selects representative image data from the plurality of items of image data for which the predetermined relationship holds true; and a transfer unit which transfers the representative image data selected by the selection unit and the list generated by the generation unit to an external apparatus.

According to another aspect of the present invention, there is provided a control method for an image processing apparatus comprising the steps of:

picking up images of an object and generating image data;

determining whether or not a predetermined relationship holds true between image pickup conditions of a plurality of items of image data generated in the step of picking up;

generating, if it is determined that the predetermined relationship holds true, a list of plurality of items of image data generated in the step of picking up;

selecting representative image data from the plurality of items of image data for which the predetermined relationship holds true; and transferring the representative image data selected in the step of selecting and the list generated in the step of generating to an external apparatus.

According to yet another aspect of the present invention, there is provided a program stored in a computer-readable storage medium for causing a computer to execute a control method for an image processing apparatus, the control method comprising the steps of:

picking up images of an object and generating image data;

determining whether or not a predetermined relationship holds true between image pickup conditions of a plurality of items of image data generated in the step of picking up;

generating, if it is determined that the predetermined relationship holds true, a list of plurality of items of image data generated in the step of picking up;

selecting representative image data from the plurality of items of image data for which the predetermined relationship holds true; and transferring the representative image data selected in the step of selecting and the list generated in the step of generating to an external apparatus.

Further features of the present invention will become apparent from the following description of exemplary embodiments with reference to the attached drawings.

DESCRIPTION OF THE EMBODIMENTS

Preferred embodiments of the present invention will now be described with reference to attached drawings. Each embodiment described below will be helpful in understanding a variety of concepts from the generic to the more specific.

It should be noted that the technical scope of the present invention is defined by claims, and is not limited by each embodiment described below. In addition, all combinations of the features described in the embodiments are not always indispensable for the present invention.

First Embodiment

<Overview of First Embodiment>

Figure 1A:
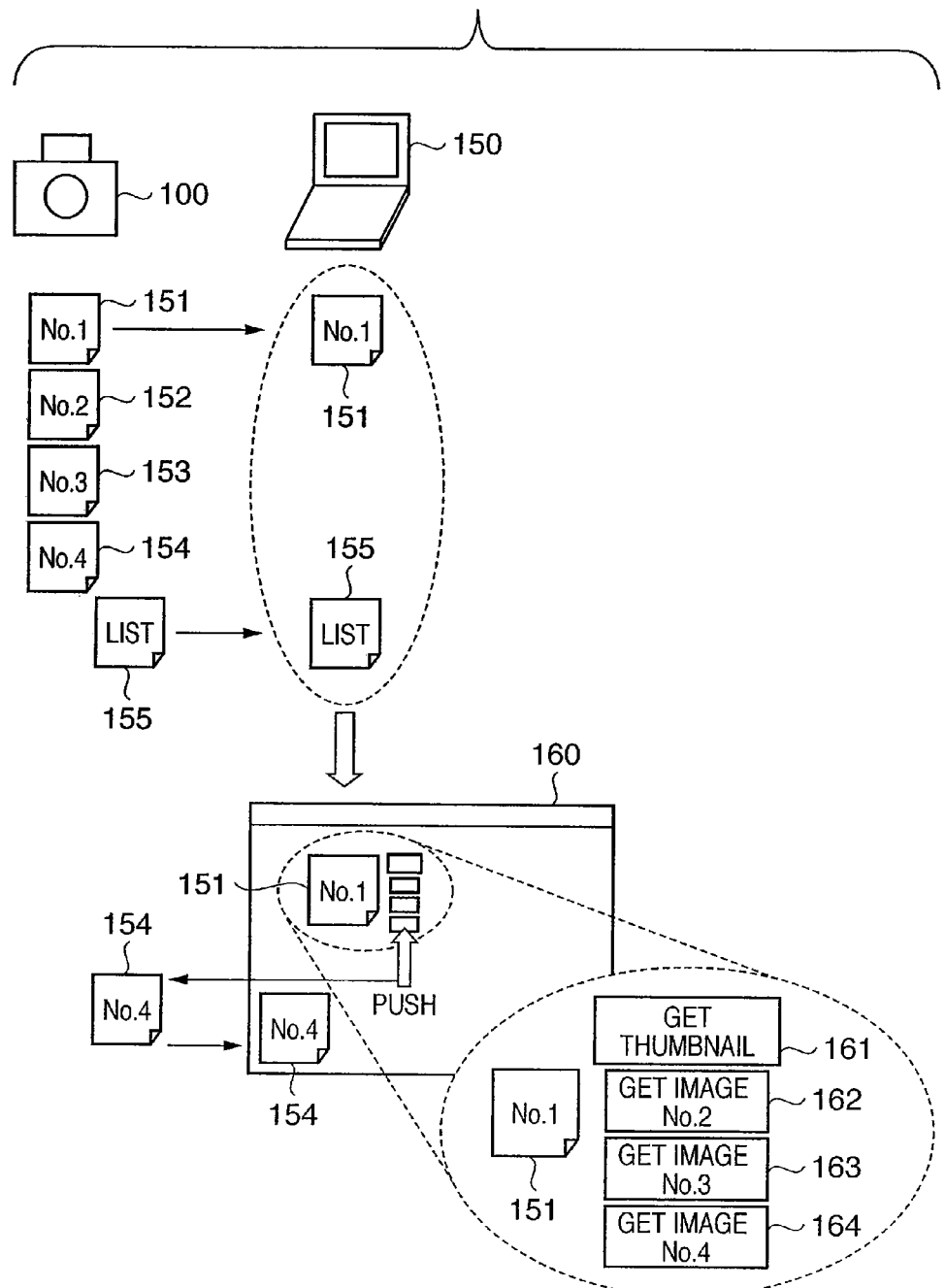
FIG. 1A is a diagram showing the overview of a first embodiment.

FIG. 1A is a diagram showing the overview of a first embodiment. In this embodiment, a digital camera 100 is used as an exemplary image processing apparatus, and a PC (personal computer) 150 is used as an exemplary external apparatus. The digital camera 100 and the PC 150 are connected with each other over a network, which may be wired or wireless.

Items of image data 151 to 154 are continuously shot image data obtained continuously with a continuous shooting function of the digital camera 100. When items of image data are continuously obtained with the continuous shooting function of the digital camera 100 like this, only one (e.g., the image data 151) of the items of image data is transferred to the PC 150 as a representative image. The representative image may be transferred at any time. For example, it may be transferred just after the representative image is determined, or when the digital camera 100 receives a transfer instruction from the PC 150. Image data shot and obtained without the continuous shooting function is also transferred to the PC 150 at any time.

A list 155 is for managing the image data 151 to 154 as a group. While described in detail later, in brief, the list 155 indicates that the items of image data 151 to 154 belong to the same group, in which the image data 151 has already been transferred to the PC 150. The list 155 is generated by the digital camera 100 and transferred to the PC 150.

An application 160 is for a user to manage image data received from the digital camera 100, and it runs on the PC 150. A window of the application 160 (hereinafter simply referred to as the "application 160") displays the already received image data 151. The image data 151 may be displayed in any form recognizable to the user, for example the name of a file containing the image data 151, or a thumbnail image for the image data 151.

The application 160 also includes a thumbnail image acquisition button 161 and an image data acquisition buttons 162 to 164. The thumbnail image acquisition button 161 is a button for the user to give the instruction to acquire thumbnail images for items of image data (i.e., the image data 152 to 154) not yet received by the PC 150 among the items of image data included in the list 155. The image data acquisition buttons 162 to 164 are buttons for the user to give the instruction to individually acquire unreceived items of image data (the image data 152 to 154) belonging to the same group as the image data 151 (the representative image). Once an item of image data corresponding to one of the image data acquisition buttons 162 to 164 are acquired, the corresponding image data acquisition button is made unavailable for user selection, such as by graying out the button.

In the example of FIG. 1A, the image data acquisition button 164 is selected by the user, so that the image data 154 is transferred from the digital camera 100 to the PC 150. The transferred image data 154 is displayed on the application 160.

The digital camera 100 is supposed to have a function (hereinafter referred to as an "automatic transfer function") of automatically transferring shot and obtained image data to an external apparatus such as the PC 150 immediately after shooting.

<External View of Digital Camera 100>

Figure 1B:
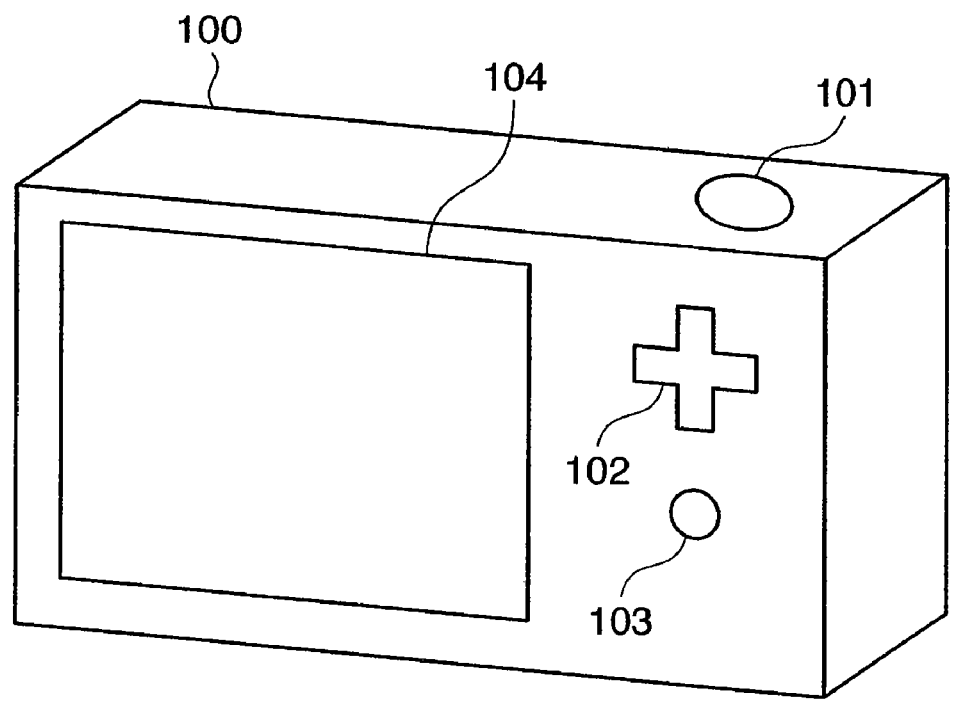
FIG. 1B is a diagram showing an exemplary external view of a digital camera.

FIG. 1B is a diagram showing an exemplary external view of the digital camera 100. A shutter button 101, a cross-shaped key 102, and a determination button 103 are seen, which are included in an operation unit 206 (see FIG. 2) to be described below. A display unit 104 that displays a shot image and also functions as an EVF (electronic viewfinder) is also seen.

Figure 2:
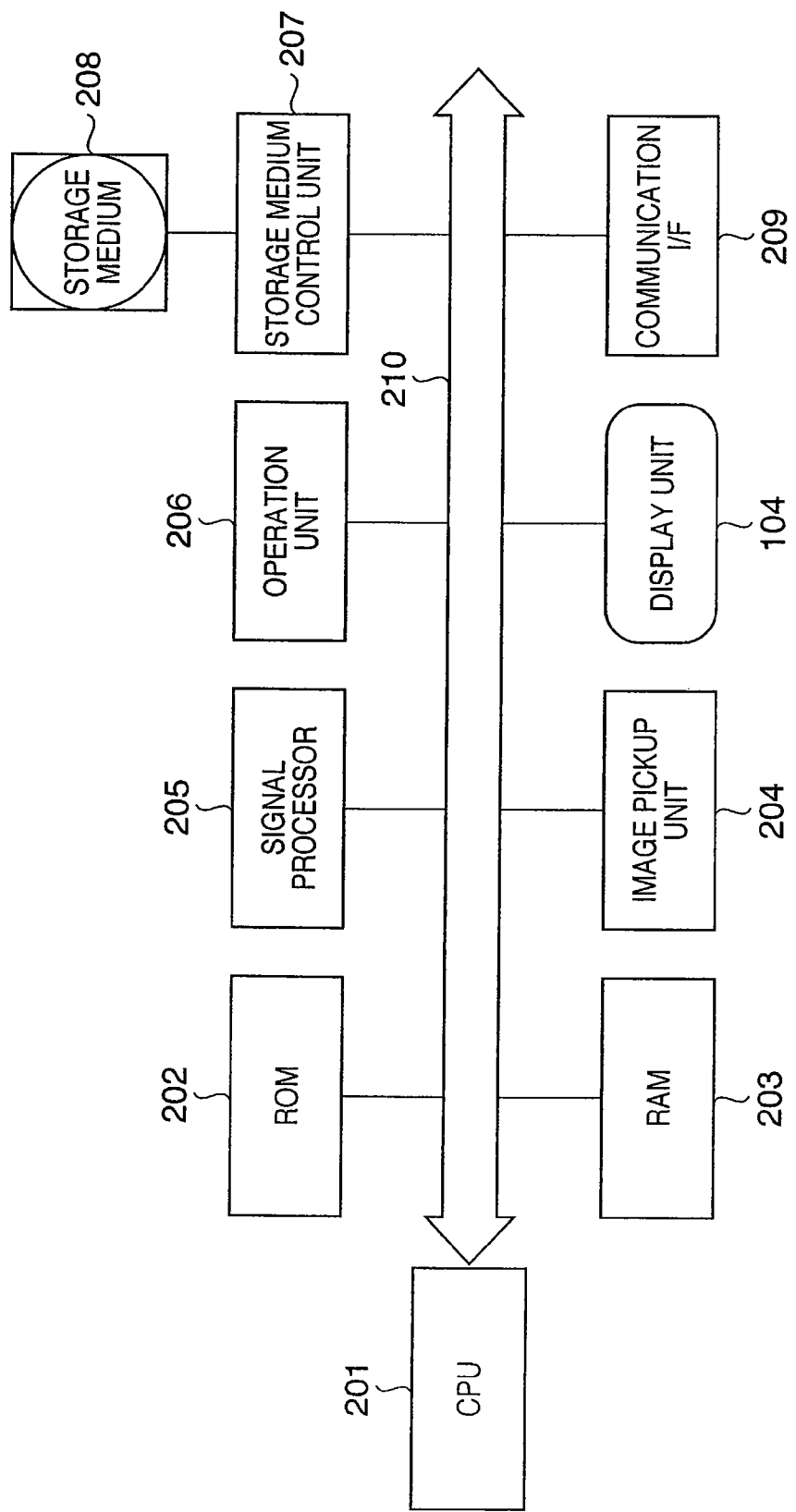
FIG. 2 is a block diagram showing the hardware architecture of the digital camera.

The components of the digital camera 100 shown in FIG. 1B are only exemplary, and components to be described below with reference to FIG. 2 are also included. Components unessential for implementing the present invention may also be included as long as they do not interfere with the implementation of the present invention.

<Hardware Architecture of Digital Camera 100>

FIG. 2 is a block diagram showing the hardware architecture of the digital camera 100.

The digital camera 100 includes a system bus 210 and the following components connected to the system bus 210.

A CPU 201 controls the entire digital camera 100 by executing a control program stored in a ROM 202.

The ROM 202 is non-volatile memory storing the above control program and so on.

A RAM 203 is volatile memory used as a work area when the CPU 201 executes the control program.

The RAM 203 is also used as an area for temporarily buffering shot image data before the image data is recorded on a storage medium 208.

An image pickup unit 204 includes an optical lens, a CCD, an A/D converter, and so on. The image pickup unit 204 converts light which enters through the optical lens into a digital electronic signal and stores the signal in the RAM 203.

A signal processor 205 performs signal processing such as JPEG encoding and MPEG encoding for the digital electronic signal stored by the image pickup unit 204 in the RAM 203 and generates image data. The generated image data is recorded on the storage medium 208. When images are reproduced, the signal processor 205 reproduces (decodes) the image data recorded on the storage medium 208. Although the signal processor 205 is typically implemented with a dedicated hardware circuit, the CPU 201 may implement the signal processor 205 by executing software (a program) stored in the ROM 202.

The operation unit 206 includes a power button, a shutter button, and so on. The user of the digital camera 100 can give an instruction to the digital camera 100 via the operation unit 206.

The display unit 104 is for displaying images while the image data is being reproduced. The display unit 104 may be a TFT LCD or the like. The display unit 104 may also be used as an electronic viewfinder for successively displaying images picked up by the image pickup unit 204.

A storage medium control unit 207 controls the storage medium 208 to be described below.

The storage medium 208 is for recording the image data and may be implemented by using, for example, a digital video cassette, a DVD-R, a Compact Flash (Registered Trademark), a hard disk, or the like.

A communication I/F 209 is an interface for communicating with external apparatuses and may be based, for example, on USB, IEEE 1394, Ethernet®, or the like. The communication I/F 209 may also include an analog interface that can transmit analog signals (e.g., RGB composite signals) of the image data reproduced by the digital camera 100.

<Flow of Image Data Transfer Processing>

Figure 3:
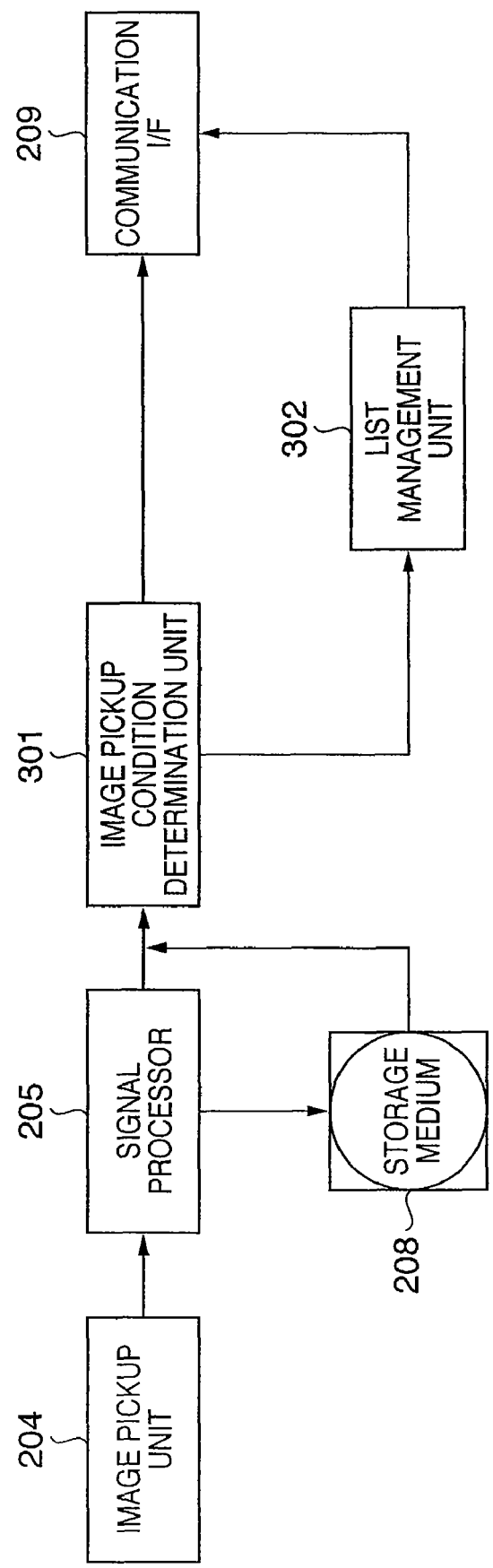
FIG. 3 is a block diagram showing the flow of processing in the digital camera in which shot image data and a list reach a communication I/F and are transferred to a PC.

FIG. 3 is a block diagram showing the flow of processing in the digital camera 100 in which shot image data and the list 155 reach the communication I/F 209 and are transferred to the PC 150. The same elements as in FIG. 2 are provided with like reference numerals in FIG. 3 and will not be described here.

An image pickup condition determination unit 301 determines whether or not the image pickup condition of an item of image data can be regarded to match that of another item of image data. Functions of the image pickup condition determination unit 301 are implemented by functions of components such as the CPU 201 and the signal processor 205 of the digital camera 100.

While the image pickup condition typically includes various parameters such as the shutter speed and the aperture value, this embodiment focuses on only the shooting time. That is, if an item of image data is shot within t seconds (t is a predetermined threshold) from the shooting time of the last item of image data, the image pickup condition determination unit 301 determines that they match in their image pickup condition. Setting the value of t shorter (e.g., around one to two seconds) increases the likelihood that two items of image data matching in their image pickup condition are images with a high correlation with each other. The image pickup condition determination unit 301 determines the shooting time of image data by referring, for example, to Exif information regarding the image data.

Of course, the image pickup condition determination unit 301 may be configured to directly determine the correlation between an item of image data and the last item of image data and if the correlation is high, determine that they match in their image pickup condition.

A list management unit 302 manages the above-described list 155 (the details will be described later). Functions of the list management unit 302 are implemented by functions of components such as the CPU 201 and the storage medium 208 of the digital camera 100.

As shown in FIG. 3, an optical image picked up by the image pickup unit 204 is converted into image data in the signal processor 205. The image data is recorded on the storage medium 208 and also input to the image pickup condition determination unit 301. According to the determination result in the image pickup condition determination unit 301, the list management unit 302 manages the list 155. The communication I/F 209 transfers the list 155 and at least one item of image data (e.g., the image data 151 in FIG. 1A) among a series of items of image data matching in their image pickup condition to the PC 150.

It is also possible to input image data already stored on the storage medium 208 to the image pickup condition determination unit 301 without using the image pickup unit 204.

<Directory Structure on Storage Medium 208>

Figure 4:
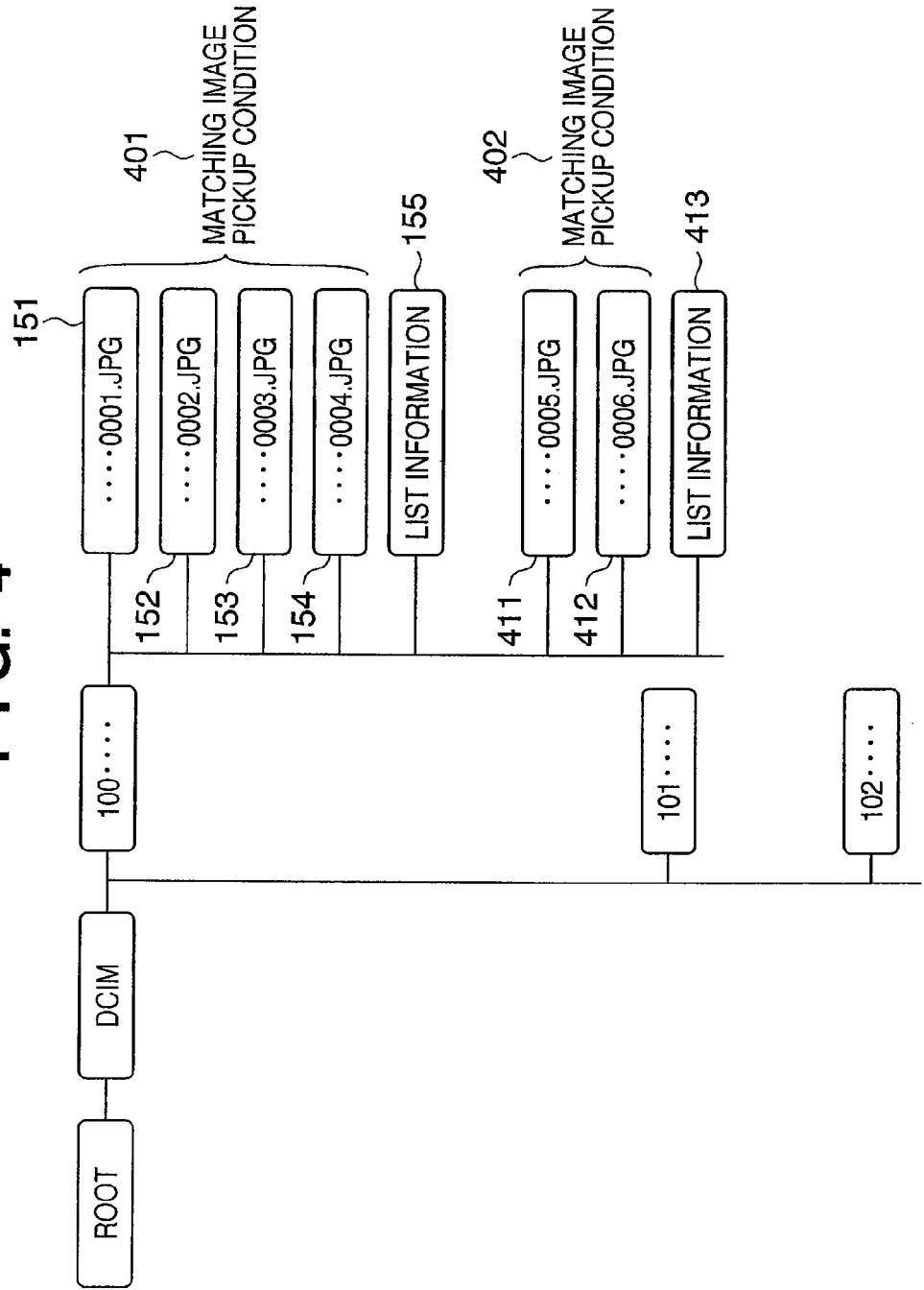
FIG. 4 is a diagram showing an exemplary directory structure on a storage medium.

FIG. 4 is a diagram showing an exemplary directory structure on the storage medium 208.

The storage medium 208 has a "ROOT" directory, immediately below which is a "DCIM" directory, further below which are directories containing image data, such as "100 . . . " and "101 . . . " directories.

The "100 . . . " directory contains, for example, four items of image data 151 to 154 matching in their image pickup condition and a corresponding list 155, which constitute a group 401. The "100 . . . " directory further contains two items of image data 411 to 412 matching in their image pickup condition and a corresponding list 413, which constitute a group 402. The "100 . . . " directory may contain further groups, or independent items of image data whose image pickup condition matches no other items of image data.

<Structure of List 155>

Figure 5:
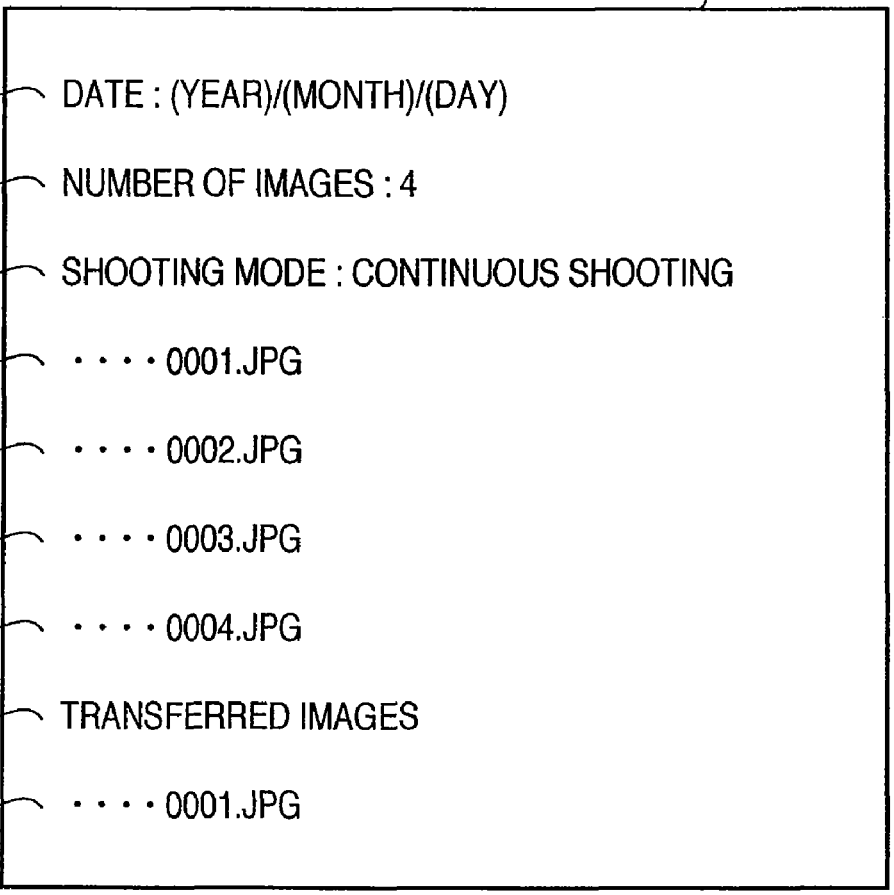
FIG. 5 is a diagram showing an exemplary structure of the list.

FIG. 5 is a diagram showing an exemplary structure of the list 155 as an exemplary list.

The list 155 contains a generation date 501, the number of images 502 indicating the number of items of image data included in the list 155, a shooting mode 503 of the digital camera 100 upon generation of the list 155 (in this example, the continuous shooting mode), and so on. The list 155 also contains the name of files of the items of image data 151 to 154 that match in their image pickup condition and are managed as a group by the list 155, and transferred images 504 indicating ones already transferred to the PC 150 among those items of image data.

<Concept of Image Data Transfer Using Automatic Transfer Function>

Figure 6:
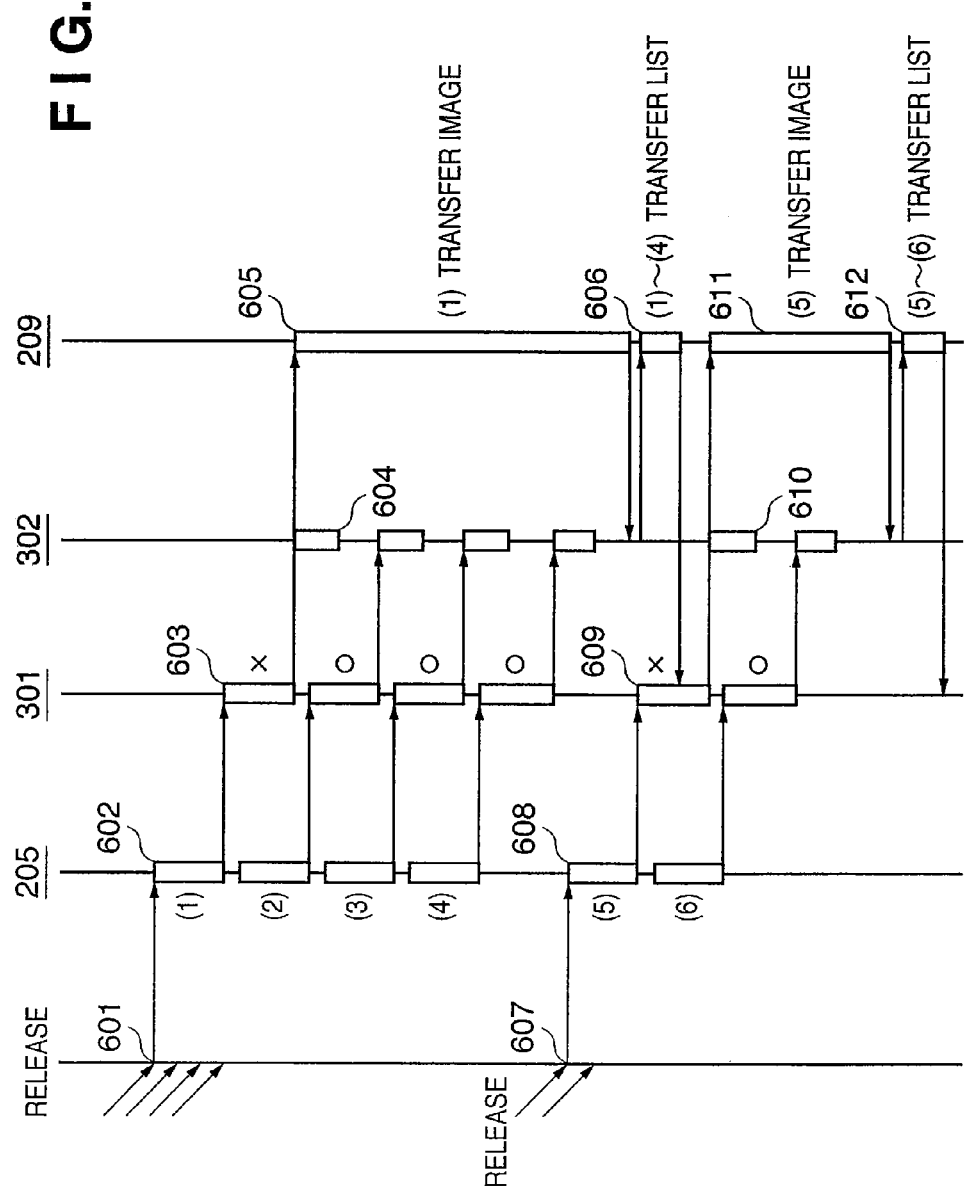
FIG. 6 is a diagram schematically showing transfer of image data using automatic transfer function in the digital camera.

FIG. 6 is a diagram schematically showing transfer of image data using an automatic transfer function in the digital camera 100.

Before transferring image data, the digital camera 100 must set necessary information including its own IP address and the IP address of the destination PC 150. In addition to the setting of this necessary information, the digital camera 100 and the PC 150 need to be connected with each other in advance with a protocol such as TCP/IP. It is assumed that t is set to a time slightly longer than the interval of continuous shooting.

In FIG. 6, it is assumed that four shots are continuously taken with a first release at time 601, and two shots are continuously taken with a second release at time 607.

Upon the first release at time 601, the signal processor 205 continuously generates four items of image data at time 602.

Once a first item of image data in the four items of image data has been generated, the image pickup condition determination unit 301 starts determination of the matching of the image pickup condition at time 603 in parallel with generation of the rest of the image data. Since the first item of image data has been shot not less than t seconds after the last shooting, it is determined that the image pickup condition has changed (indicated by "x" in the figure). The first item of image data is sent as a representative image to the communication I/F 209, and the list management unit 302 generates a new list at time 604. The first item of image data, selected as the representative image, is transferred to the PC 150 at time 605.

Since the second to fourth items of image data match the first item of image data in their image pickup condition (indicated by "○" in the figure), the list management unit 302 adds them to the list as image data belonging to the same group as the first item of image data. However, they are not transferred to the PC 150.

When the first item of image data has been transferred and it is determined that no more image data of the same group as the first item of image data is added, the communication I/F 209 transfers the list to the PC 150 at time 606. That is, if at least one item of image data determined to be unmatched in the image pickup condition by the image pickup condition determination unit 301 is shot or if t or more seconds have elapsed since the last shooting, the group is fixed and the list can be transferred.

Upon the second release at time 607, processing is performed in the same manner as the processing from time 602 to time 606. However, if the transfer of the list for the first release has not been completed at time 611, no image data is transferred until the transfer of the list is completed.

Even when the continuous shooting function is not used, it is determined that the first and second items of image data match in their image pickup condition if the second item of image data is shot within t seconds from the shooting of the first item of image data. Conversely, even when the continuous shooting function is used, it is determined that a series of items of image data do not match in their image pickup condition if the continuous shooting interval is longer than t seconds.

As described above, generation of the image data, determination of the matching of the image pickup condition, management of the list, and transfer of the image data and the list are performed in parallel. Therefore, this embodiment also has an effect of improved data transfer efficiency.

If the image data 152 in the group 401, for example, is deleted after the above-described series of processing, consistency with the list 155 already transferred to the PC 150 is compromised. Therefore, image data for which the list has been generated may be protected (i.e., a deletion inhibit attribute may be added thereto) to prevent the image data from being erroneously deleted.

While the list management unit 302 selects the representative image, the list management unit 302 may select an item of image data other than the one shot first. In that case, the representative image is transferred when it is selected, rather than being transferred at time 605.

<Details of Shooting/Transfer Processing>

Figure 7:
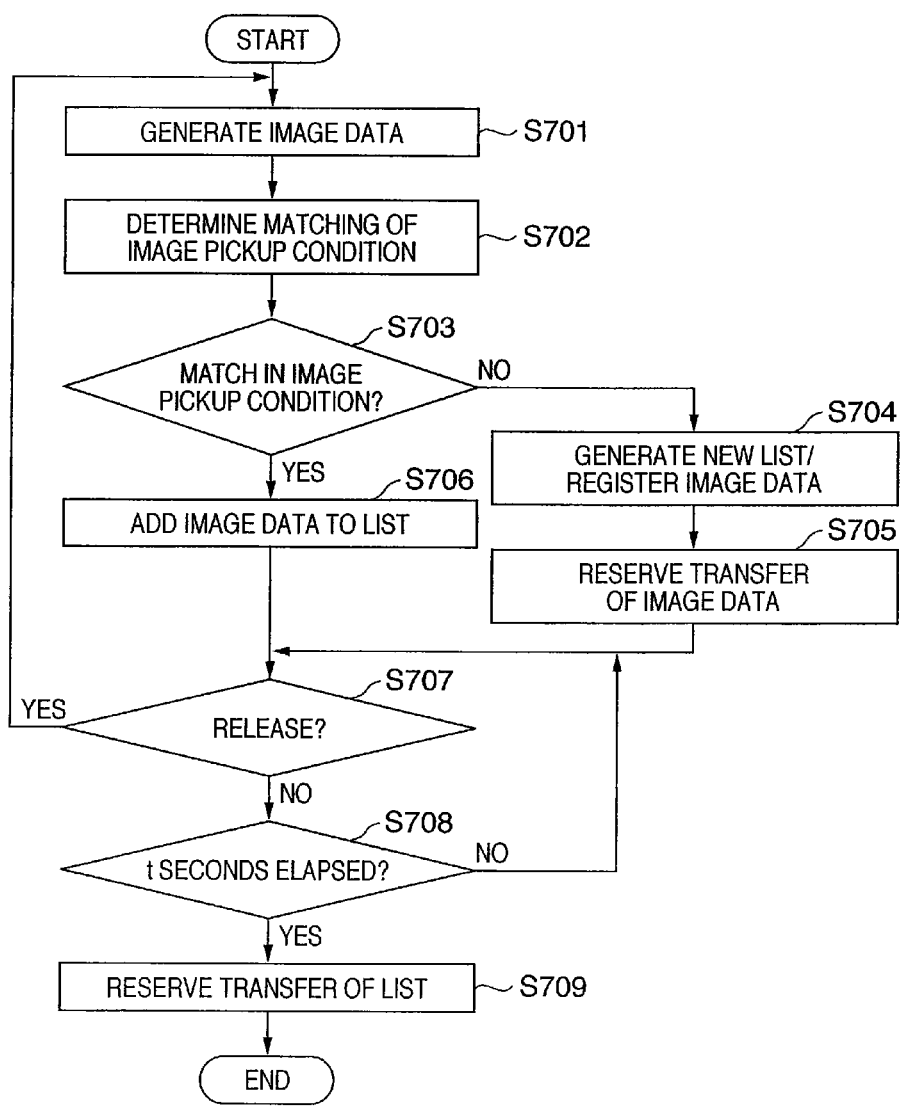
FIG. 7 is a flowchart showing the details of the flow of processing in the digital camera in which image data is shot, a list is generated, and the image data and the list are transferred to the PC.

FIG. 7 is a flowchart showing the details of the flow of processing in the digital camera 100 in which image data is shot, a list is generated, and the image data and the list are transferred to the PC 150. Processing of the flowchart is started upon a release of the shutter button 101.

In step S701, the signal processor 205 generates image data.

In step S702, the image pickup condition determination unit 301 determines whether or not the image pickup condition of the image data generated in step S701 matches that of last generated image data. If a match is obtained, the process proceeds to step S706 via step S703. Otherwise, the process proceeds to step S704 via step S703.

In step S704, the list management unit 302 generates a new list and records the list on the storage medium 208. The list management unit 302 also registers the image data generated in step S701 on the generated list and sets the image data as a transferred image (see FIG. 5).

In step S705, the communication I/F 209 reserves transfer of the image data generated in step S701 to the PC 150. As used herein, to "reserve" means to cause reserved data to be transferred when no data is being transferred between the digital camera 100 and the PC 150. Reservation is performed by, for example, storing the reserved data in a transmission queue (not shown) of the communication I/F 209.

If a match is obtained in the image pickup condition in step S703, the list management unit 302 adds in step S706 the image data generated in step S701 to the list generated in step S704.

In step S707, the CPU 201 determines whether or not a release has been performed. If a release has been performed, the process returns to step S701 to repeat the same processing. Otherwise, the process proceeds to step S708.

In step S708, it is determined whether t seconds have elapsed since the last image data generation. If t seconds have elapsed, the process proceeds to step S709. Otherwise, the process returns to step S707.

In step S709, the communication I/F 209 reserves transfer of the list. However, if only one item of image data is registered on the list, the list need not be transferred because a group of a plurality of items of image data has not been formed.

<Details of Application 160>

Figure 8:
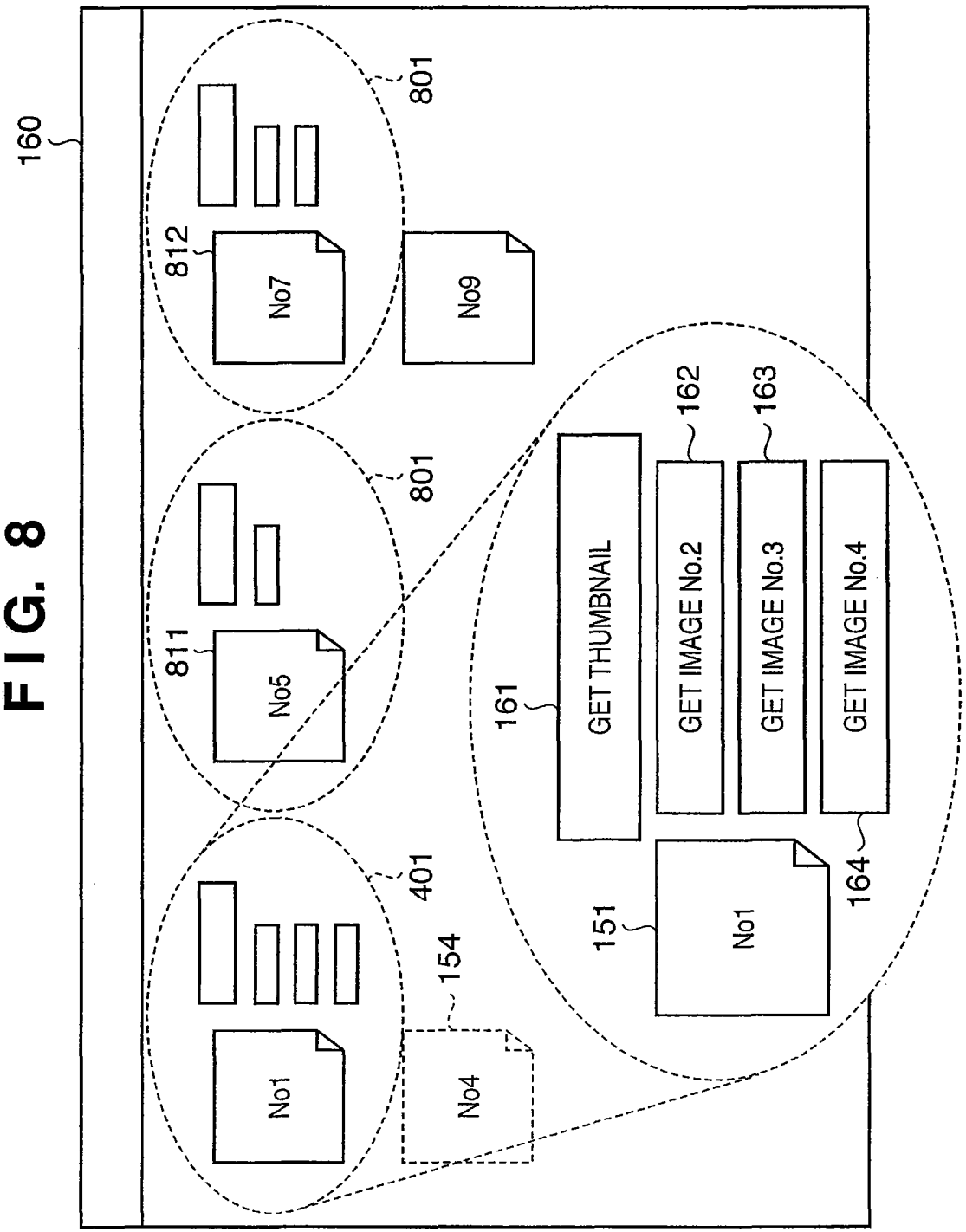
FIG. 8 is a diagram showing the details of an application.

FIG. 8 is a diagram showing the details of the application 160. The application 160 displays groups 401, 801, and 802 of image data transferred from the digital camera 100, in which a representative image (such as the image data 151) is displayed for each group.

Items displayed in the application 160 depend on the representative images and the lists transferred from the digital camera 100.

To focus attention on the group 401, the image data acquisition buttons 162 to 164 are displayed corresponding to the image data 152 to 154 not yet to be transferred. If the image data acquisition button 164 is selected in this state, a transfer request to transfer the image data 154 is sent to the digital camera 100. When the digital camera 100 receives the transfer request, the image data 154 is transferred from the digital camera 100 and placed near the group 401. At this point, an identifier indicating that the image data 154 has been transferred is added to the transferred images 504 on the list 155. Similarly, an addition is made on the list 155 stored on the storage medium 208 of the digital camera 100 so that consistency is maintained.

<Variations>

This embodiment has been described assuming that image data such as the image data 151 is transferred as the representative image from the digital camera 100 to the PC 150. Alternatively, the representative image may be a thumbnail image for image data such as the image data 151, rather than the image data itself. This reduces the time required for transferring the representative image, and only image data that the user needs can be transferred later.

Although it has been assumed that the representative image is the first item of image data in each group (e.g., the group 401), the representative image may be other items of image data. In that case, the representative image is selected after all items of image data belonging to a group, for example the group 401, are generated. The representative image may be selected, for example, by computing all correlations between items of image data belonging to the group and selecting one with the highest total correlation among all other ones as the representative image. Furthermore, two or more items of image data may be selected as representative images.

Although this embodiment has been described assuming that the automatic transfer function of the digital camera 100 is used, the automatic transfer function may not necessarily be used. In such cases, the image data and the lists already stored on the storage medium 208 are transferred from the digital camera 100 to the PC 150. Therefore, this embodiment is even applicable to an image processing apparatus without the image pickup unit 204 as long as the apparatus can store image data and lists.

Furthermore, the digital camera 100 may generate lists at times other than shooting times. For example, when items of image data not grouped into lists are stored in the digital camera 100, if the digital camera 100 receives a list generation instruction from the operation unit 206 or the like, the digital camera 100 generates lists by referring to information such as Exif information about the image data. Specifically, the digital camera 100 uses the Exif information to obtain the image pickup condition (e.g., the shooting order) of the stored items of image data. The digital camera 100 then generates lists with a procedure similar to that of steps S701 to S707 (except S705) in FIG. 7. This time, in step S701, the digital camera 100 uses the image data stored in the digital camera 100 instead of generating image data. In step S707, as long as the next image data exists in the shooting order (e.g., in the case that the items of image data are processed in order of shooting time), it is determined that "a release has been performed" and the process proceeds to step S701.

In other words, the image pickup condition determination unit 301 obtains the image pickup condition of each of the stored items of image data and classifies them by grouping ones that were continuously shot at time intervals not longer than a predetermined time. The list management unit 302 generates as many lists as the number of formed groups and registers items of image data classified into the same group on the same list.

As described above, according to this embodiment, the digital camera 100 groups items of image data matching in their image pickup condition into a group and generates a list of the grouped image data. The digital camera 100 selects a representative image from the grouped image data and transfers the representative image and the list to the PC 150. The application 160 runs on the PC 150. The user can use the application 160 to browse the grouped image data and cause any items of image data other than the representative image to be transferred from the digital camera 100 to the PC 150.

In this manner, it is possible to facilitate the user's selection of items of image data to be transferred to the external apparatus among a plurality of items of image data stored in the image processing apparatus, including ones with a high correlation with each other.

Second Embodiment

In the first embodiment, the digital camera 100 automatically groups image data. In a second embodiment, when a plurality of ungrouped items of image data are stored on the storage medium 208, the user operates the digital camera 100 to select ones to be transferred to the PC 150 while they are grouped at the same time.

In this embodiment, the configuration of the digital camera 100 is the same as in the first embodiment and thereby will not be described here.

Figure 9:
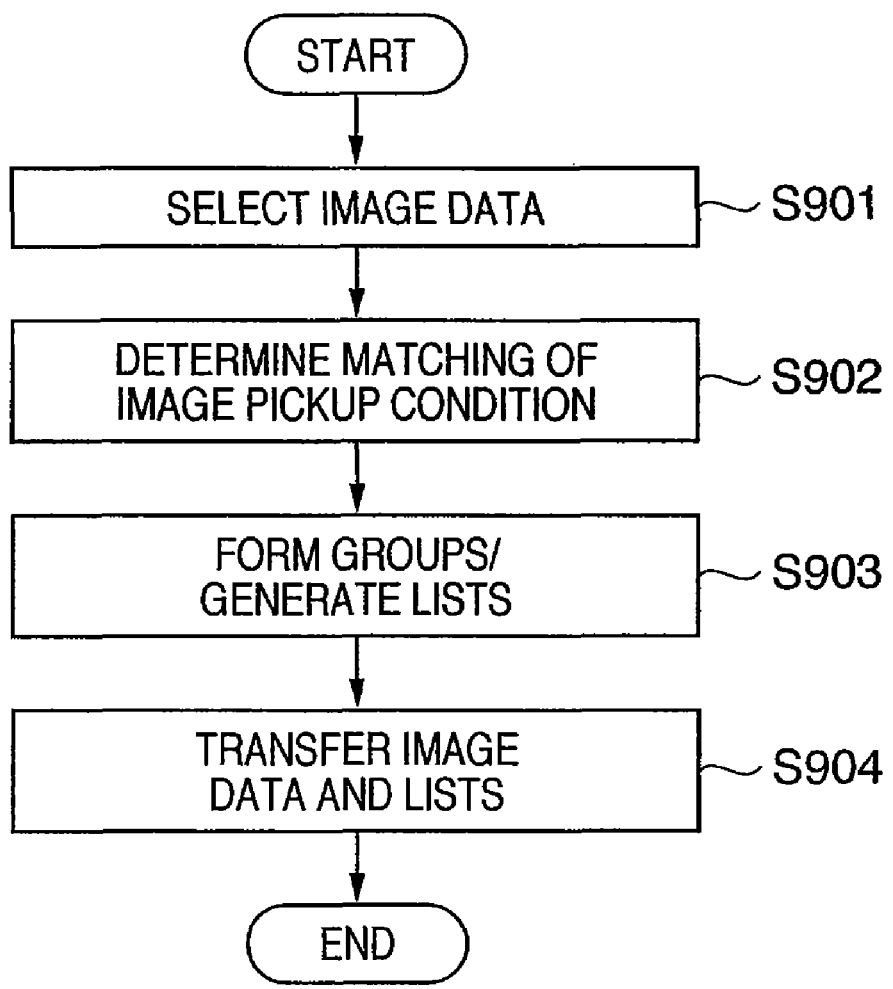
FIG. 9 is a flowchart showing the flow of processing in a second embodiment.

FIG. 9 is a flowchart showing the flow of processing in the second embodiment.

In this embodiment, it is assumed that image data shot by the digital camera 100 is already stored on the storage medium 208. Therefore, as in the first embodiment, the image pickup condition determination unit 301 determines the matching of the image pickup condition when the image data is shot and, based on the determination, determines whether to perform generation of a list or addition to a list. Then, the list management unit 302 generates a list or registers the image data.

Before transfer, the digital camera 100 needs to set necessary information including its own IP address and the IP address of the destination PC 150.

In step S901, the user uses the display unit 104 of the digital camera 100 to browse reproduced image data and select items of image data to be transferred. After selecting the image data, the user presses an image transfer button (not shown) or the like included in the operation unit 206 to start transfer.

In step S902, the image pickup condition determination unit 301 reads the selected image data from the storage medium 208 into the RAM 203 and determines the matching of the image pickup condition by using information on the list associated with the selected image data. If a plurality of items of image data matching in their image pickup condition are selected, the user may be informed thereof via the display unit 104. If a list corresponding to a selected item of image data does not exist, the list management unit 302 generates a list and registers the image data on the list in step S903 as in the first embodiment. If a corresponding list exists, the list management unit 302 registers the selected image data on the transferred images 504.

In step S904, the communication I/F 209 transfers the selected image data and the corresponding list.

Other Embodiment

The processing described in the above embodiments may be realized by providing a storage medium, storing program codes of software realizing the above-described functions, to a computer system or apparatus. By reading the program codes stored in the storage medium with a computer (or a CPU or MPU) of the system or apparatus and executing them, the functions of the above-described embodiments can be realized. In this case, the program codes read from the storage medium realize the functions according to the embodiments, and the storage medium storing the program codes constitutes the invention. The storage medium, such as a floppy® disk, a hard disk, an optical disk, a magneto-optical disk and the like can be used for providing the program codes. Also, CD-ROM, CD-R, a magnetic tape, a non-volatile memory card, ROM, and the like can be used.

Furthermore, the functions according to the above embodiments are realized not only by executing the program codes read by the computer. The present invention also includes a case where an OS (operating system) or the like working on the computer performs part or the entire processes in accordance with designations of the program codes and realizes the functions according to the above embodiments.

Furthermore, the program codes read from the storage medium may be written in a function expansion card which is inserted into the computer or in a memory provided in a function expansion unit which is connected to the computer. Thereafter, a CPU or the like contained in the function expansion card or unit may perform part or the entire processes in accordance with designations of the program codes and may realize the functions of the above embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-171695, filed on Jun. 21, 2006, which is hereby incorporated by reference herein in its entirety.

What is claimed is:

1. An image processing apparatus comprising:
   an image pickup unit which picks up images of an object and generates image data;
   a generation unit which generates a list on which one or more items of the image data generated by said image pickup unit are to be registered;
   a registration unit which registers image data on the list;
   a selection unit which selects representative image data from one or more items of image data registered on the list;
   a first transfer unit which transfers at least one of the list and the representative image data selected from the list to an external apparatus; and
   a determination unit which determines whether or not a predetermined relationship holds true between an image pickup condition of first image data generated by said image pickup unit and an image pickup condition of second image data generated one before the first image data by said image pickup unit,
   wherein
   <a> if said determination unit determines that the predetermined relationship does not hold true, said generation unit generates a new list and said registration unit registers the first image data on the list, and
   <b> if said determination unit determines that the predetermined relationship holds true, said registration unit registers the first image data on a list on which the second image data is registered, and
   wherein the first transfer unit transfers the list on which the second image data is registered to the external apparatus if it is apparent before the image pickup unit generates the first image data that the predetermined relationship will not hold true in the determination by said determination unit.

2. The image processing apparatus according to claim 1, further comprising:
   a reception unit which receives from the external apparatus a transfer request for the image data registered on the list transferred to the external apparatus; and
   a second transfer unit which transfers the requested image data to the external apparatus in response to the transfer request.

3. The image processing apparatus according to claim 1, further comprising a recording unit which, once image data has been transferred to the external apparatus, records an identifier on the list on which the image data is registered, the identifier indicating that the image data has been transferred.

4. The image processing apparatus according to claim 1, wherein said selection unit selects, as the representative image data, image data registered first on the list.

5. The image processing apparatus according to claim 1, wherein said first transfer unit transfers the representative image data to the external apparatus following the selection of the representative image data by said selection unit.

6. The image processing apparatus according to claim 1, wherein said determination unit performs the determination following the generation of the first image data by said image pickup unit.

7. The image processing apparatus according to claim 1, wherein the predetermined relationship is a relationship such that the interval between an image pickup time of the first image data and an image pickup time of the second image data is not longer than a predetermined time.

8. A control method for an image processing apparatus comprising the steps of:
   picking up images of an object and generating image data;
   generating a list on which one or more items of the image data generated in said step of picking up are to be registered;
   registering image data on the list;
   selecting representative image data from one or more items of image data registered on the list;
   transferring at least one of the list and the representative image data selected from the list to an external apparatus; and
   determining whether or not a predetermined relationship holds true between an image pickup condition of first image data generated in said step of picking up and an image pickup condition of second image data generated one before the first image data in said step of picking up,
   wherein
   <a> if it is determined that the predetermined relationship does not hold true in said step of determining, a new list is generated in said step of generating and the first image data is registered on the list in said step of registering, and
   <b> if it is determined that the predetermined relationship holds true in said step of determining, the first image data is registered on a list on which the second image data is registered in said step of registering, and
   wherein the list, on which the second image data is registered, is transferred to the external apparatus in said step of transferring, if it is apparent before the first image data is generated in said step of picking up that the predetermined relationship will not hold true in the determination in said step of determining.

9. A program stored in a non-transitory tangible computer-readable storage medium for causing a computer to execute a control method for an image processing apparatus, the control method comprising the steps of:

picking up images of an object and generating image data;
generating a list on which one or more items of the image data generated in said step of picking up are to be registered;
registering image data on the list;
selecting representative image data from one or more items of image data registered on the list;
transferring at least one of the list and the representative image data selected from the list to an external apparatus; and
determining whether or not a predetermined relationship holds true between an image pickup condition of first image data generated in said step of picking up and an image pickup condition of second image data generated one before the first image data in said step of picking up, wherein <a> if it is determined that the predetermined relationship does not hold true in said step of determining, a new list is generated in said step of generating and the first image data is registered on the list in said step of registering, and <b> if it is determined that the predetermined relationship holds true in said step of determining, the first image data is registered on a list on which the second image data is registered in said step of registering, and wherein the list, on which the second image data is registered, is transferred to the external apparatus in said step of transferring, if it is apparent before the first image data is generated in said step of picking up that the predetermined relationship will not hold true in the determination in said step of determining.

10. A non-transitory tangible computer-readable storage medium having recorded therein the program according to claim 9.

* * * * *